United States Patent
Sahoo et al.

(10) Patent No.: US 12,056,171 B2
(45) Date of Patent: Aug. 6, 2024

(54) SYSTEM AND METHOD FOR AUTOMATED INFORMATION EXTRACTION FROM SCANNED DOCUMENTS

(71) Applicant: Tata Consultancy Services Limited, Mumbai (IN)

(72) Inventors: Nihar Ranjan Sahoo, Mumbai (IN); Mahesh Kshirsagar, Mumbai (IN); Kamlesh Mhashilkar, Mumbai (IN); Pushkar Kurhekar, Mumbai (IN); Shivani Nigam, Mumbai (IN); Shriram Pillai, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 432 days.

(21) Appl. No.: 17/472,374

(22) Filed: Sep. 10, 2021

(65) Prior Publication Data
US 2022/0222284 A1     Jul. 14, 2022

(30) Foreign Application Priority Data
Jan. 11, 2021    (IN) .............................. 202121001271

(51) Int. Cl.
*G06F 16/00*     (2019.01)
*G06F 16/35*     (2019.01)
(Continued)

(52) U.S. Cl.
CPC ............ *G06F 16/35* (2019.01); *G06F 40/186* (2020.01); *G06V 30/413* (2022.01); *G06V 30/416* (2022.01); *G06V 30/10* (2022.01)

(58) Field of Classification Search
CPC ...... G06F 16/35; G06F 40/186; G06F 16/316; G06F 16/93; G06V 30/413; G06V 30/416; G06V 30/10
See application file for complete search history.

(56) References Cited

U.S. PATENT DOCUMENTS

| | | |
|---|---|---|
| 9,495,347 B2 | 11/2016 | Stadermann et al. |
| 9,785,830 B2 | 10/2017 | Hausmann et al. |

(Continued)

FOREIGN PATENT DOCUMENTS

WO    WO2007117334 A2    10/2007

OTHER PUBLICATIONS ePartner Consulting Ltd., "Paper form data capture", Form Design, 2020, EPC https://www.epc.co.uk/specialities/data-capture/form-design.

*Primary Examiner* — Syed H Hasan
(74) *Attorney, Agent, or Firm* — FINNEGAN, HENDERSON, FARABOW, GARRETT & DUNNER LLP

(57) ABSTRACT

The problem of ever-increasing huge volume of unstructured data, mainly documents, and within that the scanned documents, needs to have a solution to expedite the overall turnaround time in document centric business processing. Majority of these documents often do not strictly follow a specific format or a template, and creating a generic OCR solution, which would work on any kind of document format is needed to enhance overall efficacy of processes. Embodiments of the present disclosure provide system and method that extract tabular and text information from scanned documents. More specifically, method and system are provided to extract user filled tabular data, textual information, selected radio-buttons and checked checkboxes, stamps, barcodes from scanned copies of any filled form with or without any template being pre-defined or without any prior knowledge about format of input forms. The system converts extracted information in a structured form for further for analytics and reporting.

14 Claims, 15 Drawing Sheets

(51) Int. Cl.
  *G06F 40/186*  (2020.01)
  *G06V 30/413*  (2022.01)
  *G06V 30/416*  (2022.01)
  *G06V 30/10*   (2022.01)

(56) References Cited

U.S. PATENT DOCUMENTS

| | | | |
|---|---|---|---|
| 11,176,443 B1* | 11/2021 | Selva | G06F 18/25 |
| 2007/0168382 A1* | 7/2007 | Tillberg | G06F 16/5846 |
| | | | 707/E17.084 |
| 2011/0128360 A1* | 6/2011 | Hatzav | G03B 15/00 |
| | | | 348/61 |
| 2014/0029046 A1* | 1/2014 | Ponnavaikko | G06Q 40/02 |
| | | | 358/1.15 |
| 2015/0093021 A1* | 4/2015 | Xu | G06V 30/412 |
| | | | 382/159 |
| 2017/0372439 A1* | 12/2017 | Smith | G06V 30/416 |
| 2020/0074169 A1* | 3/2020 | Mukhopadhyay | G06F 18/22 |
| 2020/0210490 A1* | 7/2020 | Hutchins | G06N 5/02 |
| 2021/0124971 A1* | 4/2021 | Corfield | G06F 40/166 |
| 2022/0156300 A1* | 5/2022 | Paruchuri | G06N 3/08 |

* cited by examiner

XYZ Company

| Years | Region | Quarters | Data Sum of Units | Sum of Unit Cost | Sum of Total |
|---|---|---|---|---|---|
| 2014 | Central | Qtr1 | 113 | 44.97 | 1718.87 |
|  |  | Qtr2 | 255 | 11.97 | 1047.45 |
|  |  | Qtr3 | 2 | 1.25 | 2.50 |
|  |  | Qtr4 | 191 | 15.27 | 817.19 |
|  | Central Total |  | 561 | 197.21 | 3833.51 |
|  | East | Qtr1 | 95 | 1.99 | 189.05 |
|  |  | Qtr2 | 120 | 13.98 | 838.8 |
|  |  | Qtr3 | 161 | 42.96 | 2107.39 |
|  |  | Qtr4 | 153 | 44.97 | 2058.47 |
|  | East Total |  | 529 | 103.9 | 5193.71 |
|  | West | Qtr1 | 56 | 2.99 | 167.44 |
|  |  | Qtr2 | 32 | 1.99 | 63.68 |
|  | West Total |  | 88 | 4.98 | 231.12 |
| 2015 | Central | Qtr1 | 183 | 28.98 | 1968.04 |
|  |  | Qtr2 | 204 | 137.27 | 1543.91 |
|  |  | Qtr3 | 104 | 37.73 | 1701.88 |
|  |  | Qtr4 | 147 | 31.26 | 2091.73 |
|  | Central Total |  | 638 | 235.24 | 7305.56 |
|  | East | Qtr1 | 4 | 4.99 | 19.96 |
|  |  | Qtr2 | 96 | 4.99 | 479.04 |
|  |  | Qtr3 | 62 | 4.99 | 309.38 |
|  | East Total |  | 162 | 14.97 | 808.38 |
|  | West | Qtr1 | 7 | 19.99 | 139.93 |
|  |  | Qtr3 | 79 | 276.99 | 976.24 |
|  |  | Qtr4 | 57 | 19.99 | 1139.43 |
|  | West Total |  | 143 | 316.97 | 2255.6 |
| Grand Total |  |  | 2121 | 873.27 | 19627.88 |

FIG. 5

| Name: | Ram Kumar | | | Shyam Kumar | | |
|---|---|---|---|---|---|---|
| Telephone: | 4321 | | | 1230 | | |
| Address: | Name | City | Country | Name | City | Country |
| | Ram Kumar | Mumbai | India | Shyam Kumar | Delhi | India |

FIG. 6

| 1. Patient | 2. Age | 3. Sex ☐ Female ☐ Male | 4. Weight _____ lbs |
|---|---|---|---|

☒ 1. Adverse Event and/or ☐ Product Problem

2. Outcomes Attributed to Adverse Event
☐ Death:
☐ Life-threatening
☐ Disability
☒ Congenital Anomaly

| 3. Date of Event | 4. Date of Report |
|---|---|

5. Event

● INITIAL   ○ FOLLOW UP

FIG. 7A

6. Relevant Tests:

7. Other Relevant History

FIG. 7D (Form rotated 90°; fields listed:)

- 4. Date Received by Manufacturer (mm/dd/yyyy)
- 5. (A)NDA # ___  IND # ___
- 6. If IND, Give Protocol #
- 7. Type of Report
  - ☐ 5-day
  - ☒ 7-day
  - ☒ 10-day
  - ☐ 15-day
  - ● Combination Product  Yes
  - ○ OTC Product  Yes
  - ☐ Other: ___
- 8. Event Term(s)
- 9. Manufacturer
- 1. Name and Address
- Phone #
- 3. Occupation
- 4. Initial Report  ○ Yes  ● No
- 2. Health Professional?  X ___

SYSTEM AND METHOD FOR AUTOMATED INFORMATION EXTRACTION FROM SCANNED DOCUMENTS

PRIORITY CLAIM

This U.S. patent application claims priority under 35 U.S.C. § 119 to: India Application No. 202121001271, filed on Jan. 11, 2021. The entire contents of the aforementioned application are incorporated herein by reference.

TECHNICAL FIELD

The disclosure herein generally relates to document analysis, and, more particularly, to system and method for automated information extraction from scanned documents.

BACKGROUND

With ever increasing huge volume of unstructured data, mainly the documents, and within that the scanned the documents, need to expedite the overall turnaround time involved in document centric business processes is also becoming a critical business demand, and thus optical character recognition (OCR) is also witnessing high usage in business processes. Majority of these documents do not strictly follow a specific format or a template, and creating a generic OCR solution, which would work on any kind of document format is critically needed to enhance the overall efficacy of the business processes.

SUMMARY

Embodiments of the present disclosure present technological improvements as solutions to one or more of the above-mentioned technical problems recognized by the inventors in conventional systems. For example, in one aspect, there is provided a processor implemented method for automated information extraction from scanned documents. The method comprises obtaining, via one or more hardware processors, an input comprising one or more scanned documents; pre-processing the one or more scanned documents to obtain (i) one or more pre-processed documents; identifying one or more of (a) one or more sections, and (b) one or more sub-sections from the one or more pre-processed documents, wherein each of the one or more sections, and the one or more sub-sections comprise at least one of one or more tables, one or more nested tables, a header, a footer, a logo, stamp, one or more checkboxes, one or more radio buttons, a photograph, a handwritten or cursive writing text description, and a printed text description; performing a comparison of the one or more one or more pre-processed documents and one or more pre-defined templates comprised in a database; based on the comparison performing one of: (i) selecting at least one corresponding pre-defined template from the one or more pre-defined templates; and (ii) sequentially applying, one or more corresponding data extraction techniques, on the one or more of (a) one or more sections, and (b) one or more sub-sections to obtain extracted content associated with each of the one or more sections, and the one or more sub-sections, based on the at least one corresponding selected pre-defined template; or (iii) applying the one or more corresponding data extraction techniques on the one or more of (a) one or more sections, and (b) one or more sub-sections to obtain the extracted content associated with each of the one or more sections and the one or more sub-sections; tagging a label to the one or more of (a) one or more sections, and (b) one or more sub-sections upon the one or more corresponding data extraction techniques being applied thereof; tracking a sequence of the tagged label associated with the extracted content of each of the one or more sections and the one or more sub-sections; and combining the extracted content of each of the one or more sections and the one or more sub-sections to generate an output document based on the tracked sequence of the tagged label.

In an embodiment, when at least one of the one or more tables and the one or more nested tables are identified as one of a tempered table or a borderless table, the step of applying, one or more corresponding data extraction techniques comprises: estimating a bounding box for the tempered table or the borderless table; fitting one or more border lines to the tempered table or the borderless table based on the estimated bounding box; applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizontal and vertical lines for each cell such that one or more cells comprised in the tempered table or the borderless table converge straight horizontally and vertically to a table with non-overlapping content comprised therein; and extracting the non-overlapping content from the tempered table or the borderless table specific to a section.

In an embodiment, the one or more radio buttons comprise one of an oval shape radio button, or a circular shape radio button.

In an embodiment, the one or more radio buttons and the one or more checkboxes are identified based on an aspect ratio, Hull area, Solidity, an equivalent diameter, perimeter, a number of sides associated with the one or more radio buttons and the one or more checkboxes, and wherein one or more radio buttons and the one or more checkboxes are identified using a number of pixels in the geometries associated thereof.

In an embodiment, the one or more corresponding data extraction techniques comprise an optical character recognition (OCR) technique, an intelligent character recognition (ICR) technique, an optical mark recognition (OMR) technique, and a table extraction technique.

In an embodiment, the method further comprises determining number of black pixels for a cropped area around the one or more checkboxes; performing a comparison of the number of black pixels for the cropped area around the one or more checkboxes with a pre-defined threshold; and identifying the one or more checkboxes as a filled checkbox or an unfilled checkbox based on the comparison.

In an embodiment, the step of tagging a label to the one or more of (a) one or more sections, and (b) one or more sub-sections comprises: tagging a label to a section or a sub-section comprising the one or more checkboxes; sorting the one or more checkboxes in an order to obtain a set of sorted checkboxes, wherein the one or more checkboxes are sorted by sequentially determining a relative position between two checkboxes until a last checkbox and a penultimate checkbox are detected to determine an end of the section or the section comprising the one or more checkboxes.

In another aspect, there is provided a system for automated information extraction from scanned documents. The system comprises: a memory storing instructions; one or more communication interfaces; and one or more hardware processors coupled to the memory via the one or more communication interfaces, wherein the one or more hardware processors are configured by the instructions to: obtain an input comprising one or more scanned documents; pre-process the one or more scanned documents to obtain (i) one or more pre-processed documents; identifying one or more of (a) one or more sections, and (b) one or more sub-sections from the one or more pre-processed documents, wherein each of the one or more sections, and the one or more sub-sections comprise at least one of one or more tables, one or more nested tables, a header, a footer, a logo, stamp, one or more checkboxes, one or more radio buttons, a photograph, a handwritten or cursive writing text description, and a printed text description; perform a comparison of the one or more one or more pre-processed documents and one or more pre-defined templates comprised in a database; based on the comparison perform one of: (i) selecting at least one corresponding pre-defined template from the one or more pre-defined templates; and (ii) sequentially applying, one or more corresponding data extraction techniques, on the one or more of (a) one or more sections, and (b) one or more sub-sections to obtain extracted content associated with each of the one or more sections, and the one or more sub-sections, based on the at least one corresponding selected pre-defined template; or (iii) applying the one or more corresponding data extraction techniques on the one or more of (a) one or more sections, and (b) one or more sub-sections to obtain the extracted content associated with each of the one or more sections and the one or more sub-sections; tag a label to the one or more of (a) one or more sections, and (b) one or more sub-sections upon the one or more corresponding data extraction techniques being applied thereof; track a sequence of the tagged label associated with the extracted content of each of the one or more sections and the one or more sub-sections; and combine the extracted content of each of the one or more sections and the one or more sub-sections to generate an output document based on the tracked sequence of the tagged label.

In an embodiment, when at least one of the one or more tables and the one or more nested tables are identified as one of a tempered table or a borderless table, the step of applying, one or more corresponding data extraction techniques comprises: estimating a bounding box for the tempered table or the borderless table; fitting one or more border lines to the tempered table or the borderless table based on the estimated bounding box; applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizonal and vertical lines for each cell such that one or more cells comprised in the tempered table or the borderless table converge straight horizontally and vertically to a table with non-overlapping content comprised therein; and extracting the non-overlapping content from the tempered table or the borderless table specific to a section.

In an embodiment, the one or more radio buttons comprise one of an oval shape radio button, or a circular shape radio button.

In an embodiment, the one or more radio buttons and the one or more checkboxes are identified based on an aspect ratio, Hull area, Solidity, an equivalent diameter, perimeter, a number of sides associated with the one or more radio buttons and the one or more checkboxes, and wherein one or more radio buttons and the one or more checkboxes are identified using a number of pixels in the geometries associated thereof.

In an embodiment, the one or more corresponding data extraction techniques comprise an optical character recognition (OCR) technique, an intelligent character recognition (ICR) technique, an optical mark recognition (OMR) technique, and a table extraction technique.

In an embodiment, the one or more hardware processors are further configured by the instructions to determine number of black pixels for a cropped area around the one or more checkboxes; perform a comparison of the number of black pixels for the cropped area around the one or more checkboxes with a pre-defined threshold; and identify the one or more checkboxes as a filled checkbox or an unfilled checkbox based on the comparison.

In an embodiment, the step of tagging a label to the one or more of (a) one or more sections, and (b) one or more sub-sections comprises: tagging a label to a section or a sub-section comprising the one or more checkboxes; sorting the one or more checkboxes in an order to obtain a set of sorted checkboxes, wherein the one or more checkboxes are sorted by sequentially determining a relative position between two checkboxes until a last checkbox and a penultimate checkbox are detected to determine an end of the section or the section comprising the one or more checkboxes.

In yet another aspect there are provided one or more non-transitory machine-readable information storage mediums comprising one or more instructions which when executed by one or more hardware processors cause a method for automated information extraction from scanned documents by obtaining, via the one or more hardware processors, an input comprising one or more scanned documents; pre-processing the one or more scanned documents to obtain (i) one or more pre-processed documents; identifying one or more of (a) one or more sections, and (b) one or more sub-sections from the one or more pre-processed documents, wherein each of the one or more sections, and the one or more sub-sections comprise at least one of one or more tables, one or more nested tables, a header, a footer, a logo, stamp, one or more checkboxes, one or more radio buttons, a photograph, a handwritten or cursive writing text description, and a printed text description; performing a comparison of the one or more one or more pre-processed documents and one or more pre-defined templates comprised in a database; based on the comparison performing one of: (i) selecting at least one corresponding pre-defined template from the one or more pre-defined templates; and (ii) sequentially applying, one or more corresponding data extraction techniques, on the one or more of (a) one or more sections, and (b) one or more sub-sections to obtain extracted content associated with each of the one or more sections, and the one or more sub-sections, based on the at least one corresponding selected pre-defined template; or (iii) applying the one or more corresponding data extraction techniques on the one or more of (a) one or more sections, and (b) one or more sub-sections to obtain the extracted content associated with each of the one or more sections and the one or more sub-sections; tagging a label to the one or more of (a) one or more sections, and (b) one or more sub-sections upon the one or more corresponding data extraction techniques being applied thereof; tracking a sequence of the tagged label associated with the extracted content of each of the one or more sections and the one or more sub-sections; and combining the extracted content of each of the one or more sections and the one or more sub-sections to generate an output document based on the tracked sequence of the tagged label.

In an embodiment, when at least one of the one or more tables and the one or more nested tables are identified as one of a tempered table or a borderless table, the step of applying, one or more corresponding data extraction techniques comprises: estimating a bounding box for the tempered table or the borderless table; fitting one or more border lines to the tempered table or the borderless table based on the estimated bounding box; applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizonal and vertical lines for each cell such that one or more cells comprised in the tempered table or the borderless table converge straight horizontally and vertically to a table with non-overlapping content comprised therein; and extracting the non-overlapping content from the tempered table or the borderless table specific to a section.

In an embodiment, the one or more radio buttons comprise one of an oval shape radio button, or a circular shape radio button.

In an embodiment, the one or more radio buttons and the one or more checkboxes are identified based on an aspect ratio, Hull area, Solidity, an equivalent diameter, perimeter, a number of sides associated with the one or more radio buttons and the one or more checkboxes, and wherein one or more radio buttons and the one or more checkboxes are identified using a number of pixels in the geometries associated thereof.

In an embodiment, the one or more corresponding data extraction techniques comprise an optical character recognition (OCR) technique, an intelligent character recognition (ICR) technique, an optical mark recognition (OMR) technique, and a table extraction technique.

In an embodiment, the method further comprises determining number of black pixels for a cropped area around the one or more checkboxes; performing a comparison of the number of black pixels for the cropped area around the one or more checkboxes with a pre-defined threshold; and identifying the one or more checkboxes as a filled checkbox or an unfilled checkbox based on the comparison.

In an embodiment, the step of tagging a label to the one or more of (a) one or more sections, and (b) one or more sub-sections comprises: tagging a label to a section or a sub-section comprising the one or more checkboxes; sorting the one or more checkboxes in an order to obtain a set of sorted checkboxes, wherein the one or more checkboxes are sorted by sequentially determining a relative position between two checkboxes until a last checkbox and a penultimate checkbox are detected to determine an end of the section or the section comprising the one or more checkboxes It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 depicts a borderless table for information extraction, in accordance with an embodiment of the present disclosure.

FIG. 6 depicts a nested table for information extraction, in accordance with an embodiment of the present disclosure.

Figure 7C:
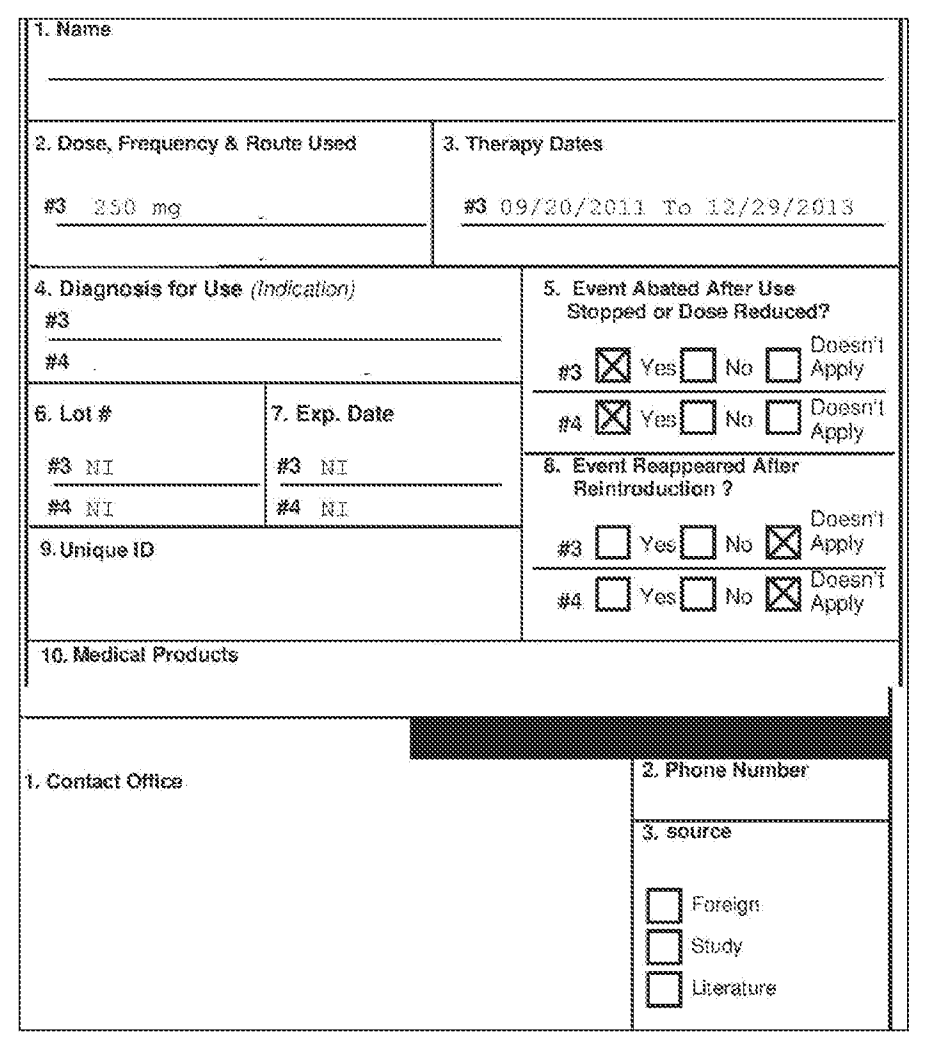

FIGS. 7A, 7B, 7C, and 7D depict sample outputs generated by the system of FIG. 1 by processing an input document, in accordance with an embodiment of the present disclosure.

DETAILED DESCRIPTION

Figure 1:
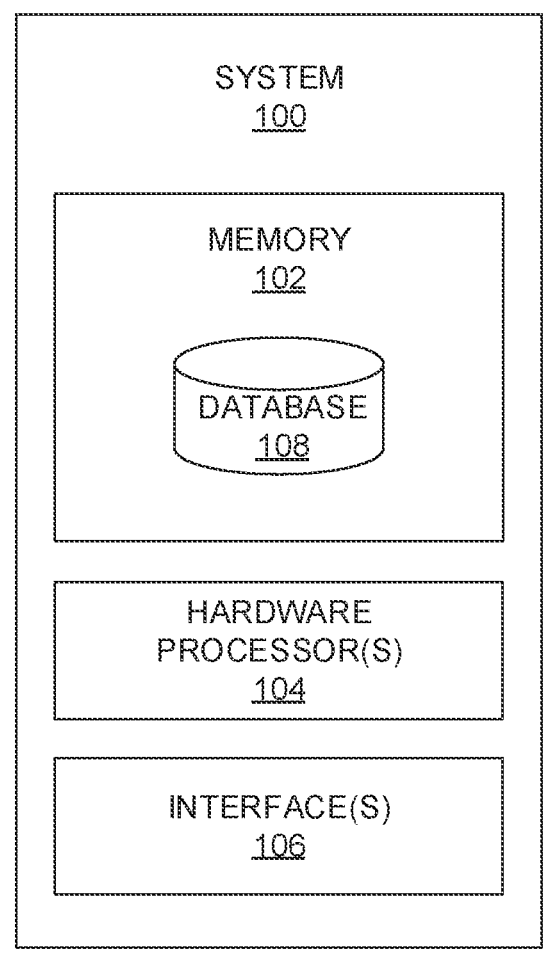
FIG. 1 depicts a system for automated information extraction from scanned documents, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated herein.

With ever increasing huge volume of unstructured data, mainly the documents, and within that the scanned the documents, need to expedite the overall turnaround time involved in document centric business processes is also becoming a critical business demand, and thus optical character recognition (OCR) is also witnessing high usage in business processes. Majority of these documents do not strictly follow a specific format or a template, and creating a generic OCR solution, which would work on any kind of document format is critically needed to enhance the overall efficacy of the business processes.

Embodiments of the present disclosure provide system and method for automated information extraction from scanned documents (e.g., *.jpeg, *.png, *.pdf, and the like). The system of the present disclosure enables extraction of tabular and text information from scanned copy of any type of form without any template. In other words, this system can extract user filled tabular data, textual information, selected radio-buttons and checked checkboxes information from scanned copies of any filled form without any template or without any prior knowledge about format of input forms. In addition to template-less information extraction, system can convert extracted information into consumable information in structured way by configuring required information in a configuration file and output may be generated in the form of extensible markup language (XML) format or JavaScript Object Notation (JSON) to be used further for analytics and reporting systems.

Referring now to the drawings, and more particularly to FIGS. 1 through 8B, where similar reference characters denote corresponding features consistently throughout the figures, there are shown preferred embodiments and these embodiments are described in the context of the following exemplary system and/or method.

FIG. 1 depicts a system 100 for automated information extraction from scanned documents, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises one or more templates for information identification and extraction from scanned documents. The database 108 further stores details associated with previously extracted information from other scanned documents, and the like.

The memory 102 further comprises one or more techniques for performing pre-processing (e.g., noise removal, background removal, filtering, image correction, and the like), and post-processing of the scanned documents. More specifically, the techniques further include image/document analysis technique, image/document quality enhancement technique, section specific content/information extraction technique, section synthesizer(s), and the like. Implementation of such techniques for pre-processing and post-processing to generate appropriate/desired output shall not be construed as limiting the scope of the present disclosure.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
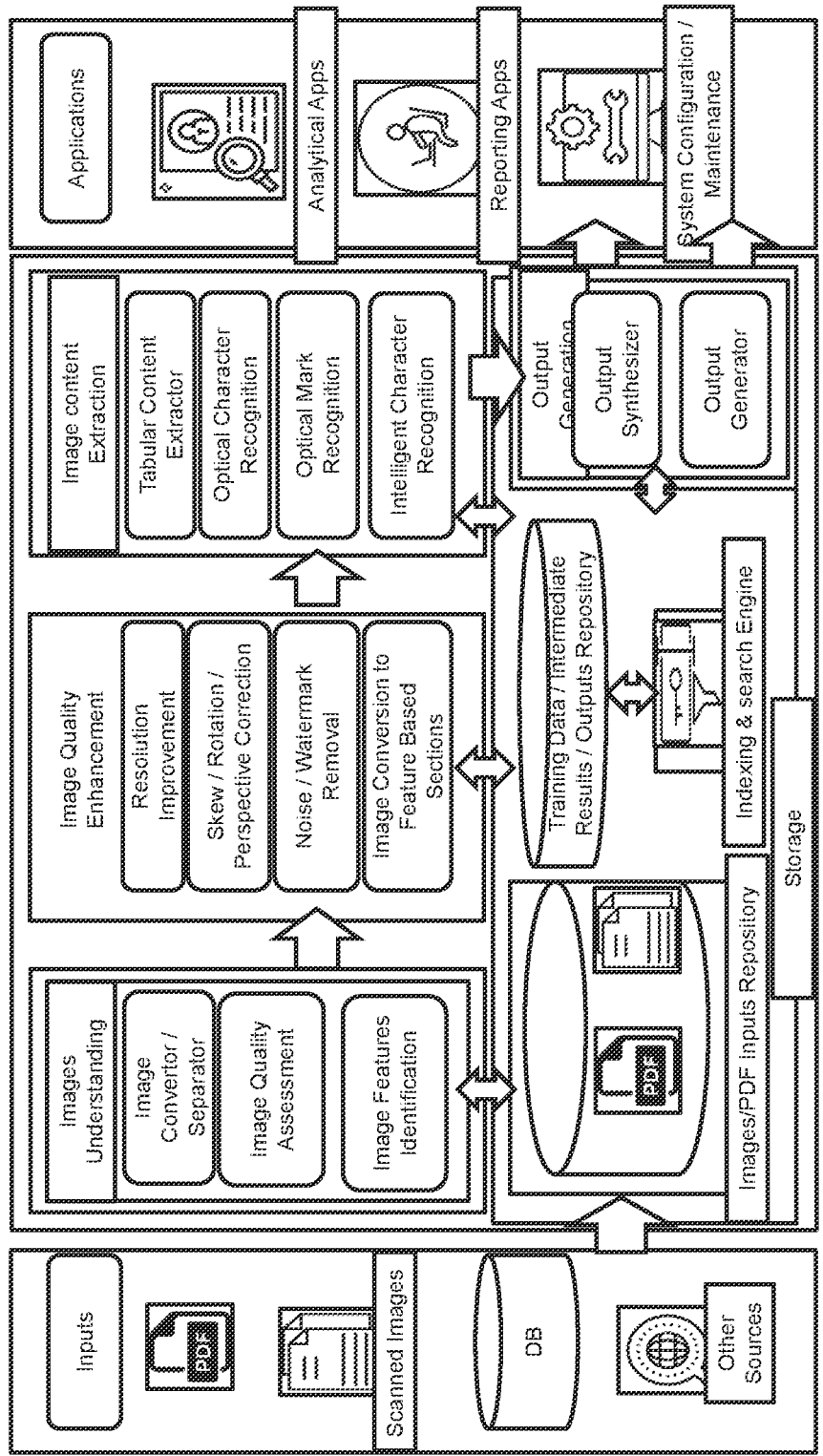
FIG. 2A and FIG. 2B depict a block diagram of the system for automated information extraction from scanned documents, in accordance with an embodiment of the present disclosure.
Figure 2B:
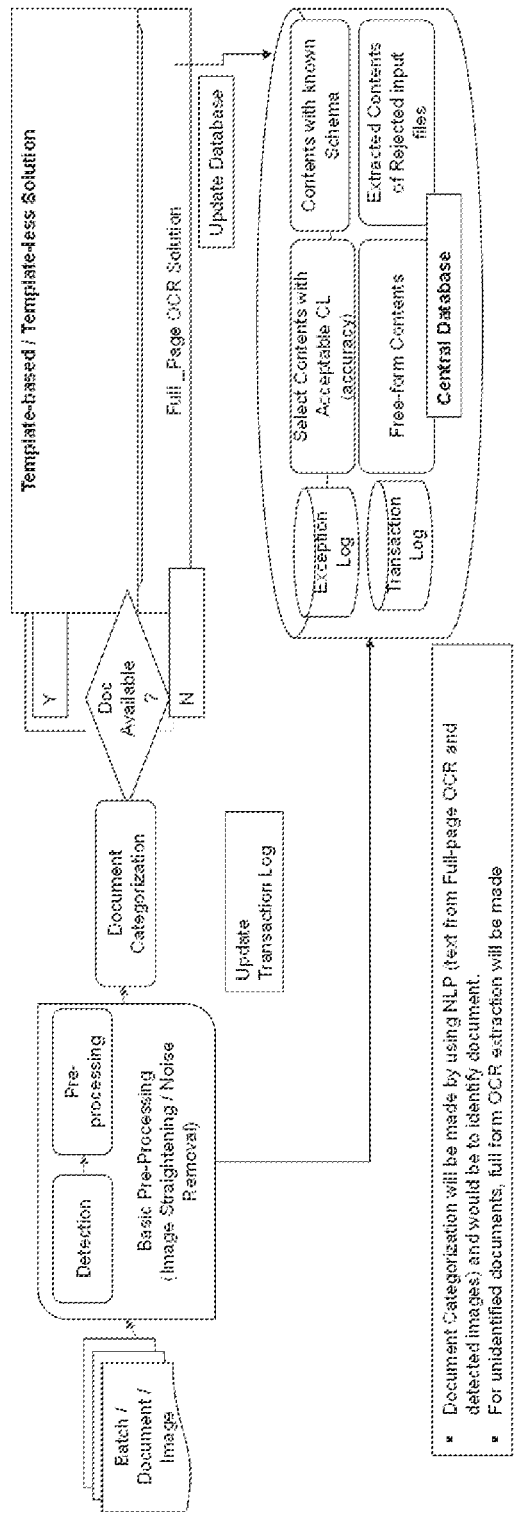

FIGS. 2A and 2B, with reference to FIG. 1, depict a block diagram of the system 100 for automated information extraction from scanned documents, in accordance with an embodiment of the present disclosure. The system 100 enables one or more users to select the type of input document or images to be extracted, wherein document/images are uploaded as input to the system 100. If the input is already in the prescribed or desired format, then the input files (e.g., images, etc.) may be separated for further processing as I←{i1, i2, i3, . . . im}. Input file may be a scanned document such as an invoice, an application form, an answer sheet, a printed document containing handwritten text, a document containing text and tables/nest tables, and the like. It is to be understood by a person having ordinary skill in the art or person skilled in the art that the above examples of input file shall not be construed as limiting the scope of the present disclosure.

Individual images are analyzed further to assess the quality through image quality assessment and features, or sections are identified through layout/structure analysis. Individual image is enhanced based on assessment of image quality and other possible issues with input images. If resolution of image is low, then resolution of image is enhanced. If image is slant i.e., skewed, rotated, or bent in depth i.e., perspective is not correct then skew/rotation/perspective correction is done. If there is noise, blackened background, or watermark in image, then these noise, blackened background and watermarks are removed from images. Followed by possible quality enhancements, images set 'I*' is divided into sections based on identified features by the system 100 (e.g., the system 100 may utilize an image features and layout analyzer which is stored in the memory 102 and invoked for execution of appropriate steps to be carried out). Features are identified as per different type of data and accordingly processed. For instance, tables may be identified for tabular data extraction, Radio buttons or checkbox groups may be identified for Optical Mark Reader based processing, textual content is processed through Optical Character Recognition and Handwritten cursive writing content is processed intelligent character recognition. Each image is divided into 'n' sections (each image may have different number of sections depending upon number of identified features, so count of sections 'n' in each image is a dynamic number).

$$S \leftarrow \{sij\} \leftarrow \text{SectionGenerator}(I^*),$$

(where $0 < i < m+1$ for 'm' number of images, $0 < j < n+1$ for 'n' number of sections in respective image i)

Each section (sij) of an image passes through respective module for data extraction as shown in FIG. 2. Tabular content section is processed though Tabular Content Extraction Module. Similarly, digital text is processed through Optical Character Recognizer. Handwritten text is processed through Intelligent Character Recognizer and Radio-Buttons/Checkboxes groups are processed through Optical mark reader modules. Cells of tabular content may contain Radio-Buttons/Checkboxes groups, digital text or handwritten cursive contents, so one module/technique can call/invoke other module/technique for further processing. To keep a track of such sub-sections, section sequence tagger plays an important role, it keeps sequence of all sections and sub-sections, so that later all sections and sub-sections of images can be combined. All sections after $$E \leftarrow \{eij\} \leftarrow \text{ContentExtractor}(S),$$

(where 0<i<m+1 for 'm' number of images, 0<j<n+1 for 'n' number of sections in respective image i)

All extracted contents of sections eij are processed through Sections Synthesizer and Output Generator to generate contents of individual images or combined output of spilled over images.

$$O \leftarrow \{oi\} \leftarrow \text{Synthesizer}(E),$$

(where 0<i<m+1 for 'm' number of images)
Extracted output is then consumed by downstream applications for further analysis and reporting.

Referring to FIG. 2, the block diagram includes a plurality of modules that are executed by the one or more hardware processors 104. The plurality of modules includes but are not limited to, input sources module, data storage module, image analysis module, image quality enhancement module, document categorizer, image section contents extraction module, output generation module and application administration and integration module. The one or more hardware processors 104 facilitates, via the input sources module, one or more user inputs for the system 100, wherein the system primarily focuses on accepting any kind of scanned image or PDF of forms submitted by users. The user inputs, intermediate results, training data, test data and outputs generated thereof by the system 100 are stored in the memory 102 via the data storage module. The image analysis module is executed by the hardware processors 104 to perform image analysis such as but are not limited to document conversion, image/document quality assessment, features identification and layout analyzer, respectively. More specifically, document/image conversion includes conversion of PDF input image/documents into one or more images or set of images into a list of individual images for further processing. The system 100 further analyses the quality of each image and generates quality metrics for possible image quality improvements. Furthermore, layout of inputs images/document are analysed and one or more (key) features in images/documents such as tables (or nested tables, borderless tables, and the like), text, header/footer, logo/icon, stamps, checkboxes/radio buttons, user's photographs, handwritten or cursive writing text, and the like. Such examples of features shall not be construed as limiting the scope of the present disclosure.

Header/Footer Margin Identification—First foremost challenge in identifying the features and layout identification is to find the top/bottom and left/right margins of images. Usually left and right margins are blank, so it becomes easier identify them and further there are no extraction of contents as well. If there is any content in left and right margin, that is usually text with different orientation, so again identifying and extraction is not that difficult. Top and Bottom margins with clear distinction from body text are easier to identify and extract, whereas top and bottom contents with narrow distinction space or overlapping with image body contents are relatively complex to extract, knowledge module with rules and highly trained machine learning models makes it possible to identify those contents very accurately.

Tabular Content Identification—Simple tables (viz. Horizontal or Vertical Tables) with borders are easier to identify through rules engine, whereas contents with complex tables (viz. combination of horizontal and vertical tables, tempered bordered tables, borderless tables etc.) need highly trained machine learning models based on convolutional neural networks to identify these complex tables. If borders of tables are tempered or tables are borderless, then system 100 fits border lines intelligently to provide table structure to the tables within image. System 100 is intelligent enough to distinguish non-table and tabular contents. Line structure of tables (based on the dark pixel pattern) detects tables on a page. In case tabular structure has broken lines, gaps and holes, pre-processing is made to enhance the tabular structure and reviewed. Once table is identified, then next level of complexity is to identify the contents of cells, which can be nested tables, digital text, radio-buttons/checkboxes groups, handwritten text or a photograph/logos etc., system traverses inside the table structures cell by cell in each row and identifies the contents of cells. Cells may be spanned or overlapped to more than one cell horizontally and vertically. rules are implemented in knowledge engine comprised in the memory 102 to identify cell structures in tables that can identify structure of any table. The knowledge engine implements one or more various configurable rules and runs highly trained models to identify different features and layouts in input image. Rules engine and Machine Learning module comprised in the memory 102 are executed to facilitate identification of different features and layout of the image. Rules engine has several rules written in computer language to identify the contents that are deterministic in nature, whereas Machine Learning Module helps in identifying probabilistic features and layout identification tasks.

Logo/icon Identification—Next level of complexity is to identify logos/icons within images that is achieved through state-of-the-art machine learning algorithms that can distinguish between tables, logos, and photographs with a great accuracy.

Digital Text Identification—System 100 identifies different characteristics of digital text present in input image like font, size, orientation, color, bold, character spacing, word spacing, text indentation, line height, etc. The system 100 identifies availability of digital text with its properties in input image or a part of image.

Once the image analysis is performed and completed, the hardware processors 104 perform image enhancement for improving the quality of input files (e.g., images, documents, or combinations thereof) wherein one or more quality attributes are processed through Artificial Intelligence-based technique followed by enhancements. For example, quality attribute such as tonal variation in watermark over background text in image, text orientation on the image, any perspective transformation in image, resolution of image, and the like are detected first before they are pre-processed. More specifically, input file enhancement includes but are not limited to (i) resolution enhancement wherein low resolution images are converted into high resolution images, (ii) skew, rotation, and perspective correction wherein the input file is checked for the slanting (skewness), rotation and depth perspective and appropriate corrections are made by the system 100 for better processing of image's data, (iii) noise, blackened background, and watermark removal wherein noise/blackened background/watermark are removed from the background on image/input file, if any, (iv) detection of broken lines or corners on tables, page header and footer, page continuation to be made prior to they are fixed or enhanced for processing, (v) image conversion to feature based sections wherein each image or input file is divided into set of sections/features as were analyzed by image feature and layout analyzer for further processing. The above points are better understood by way of following description:

For instance, resolution enhancement is performed wherein quality of content extraction improves with high resolution images and vice versa. Images with 300 DPI or more are usually considered as good quality images, whereas quality reduces below 300 DPI. Identification of input image's quality is important to assess the requirement of improving the resolution of image, so that good quality contents may be extracted.

Another example, for skew, rotation, and perspective correction: When image contents are slanting at an angle in an image rather than being straight, then such image slanting angle need to be identified, so that it can be de-skewed to support content extraction and appropriate skew correction is performed by the system 100. Similarly, when an image's contents are rotated to an angle multiple of 90 degrees then such rotation need to be corrected, so that right content gets extracted from images. Likewise, many a time, contents of images are bent in depth e.g., when content of book or file is scanned which is close to scanner at one side and little far at other side as pages are turned to center or pinned at corner, then contents look bigger at closer side and smaller at page center or corner. Such depth contents should be made straight, so that right content extraction may be extracted.

Noise, blackened background, and watermark removal: Scanned images usually have noise or small marks on the background that make content extraction difficult, so identifying and correcting such noise is important and the same is carried out by the system 100 for appropriate noise cancellation/filtering to output noise free output file. Further, in tabular contents, headings of columns are darkened or greyed out, which cause problem in content extraction. Such blackened backgrounds are corrected by the system 100, so that quality of content extraction may be maintained. Most images have watermarks in background that need to be identified and removed, so that quality of content extraction may be maintained. Hence, the system 100 identifies watermarks in the background and are removed accordingly.

Figure 3A:
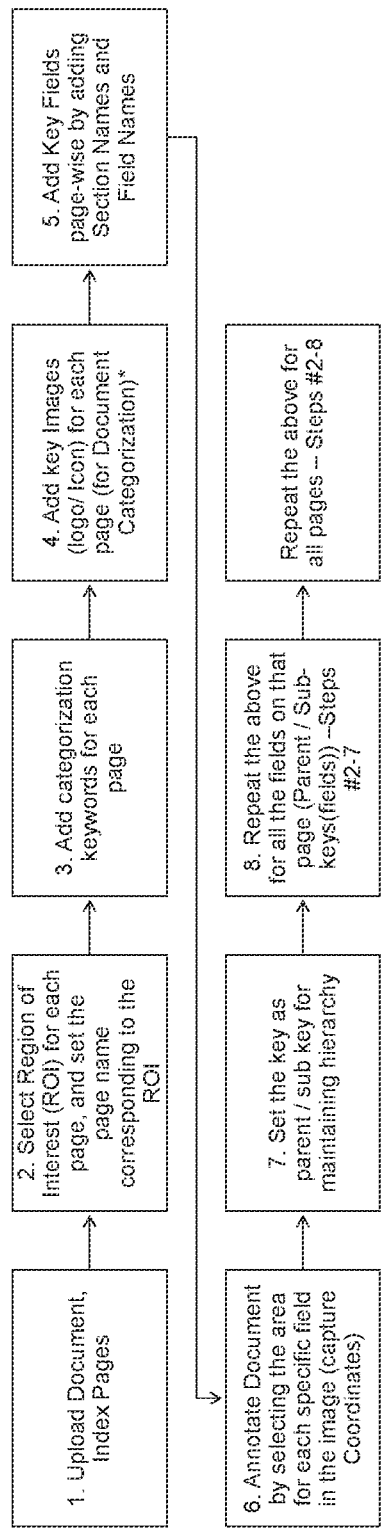
FIG. 3A depicts a flow-diagram for template-based information extraction from the scanned document, in accordance with an embodiment of the present disclosure.
Figure 3B:
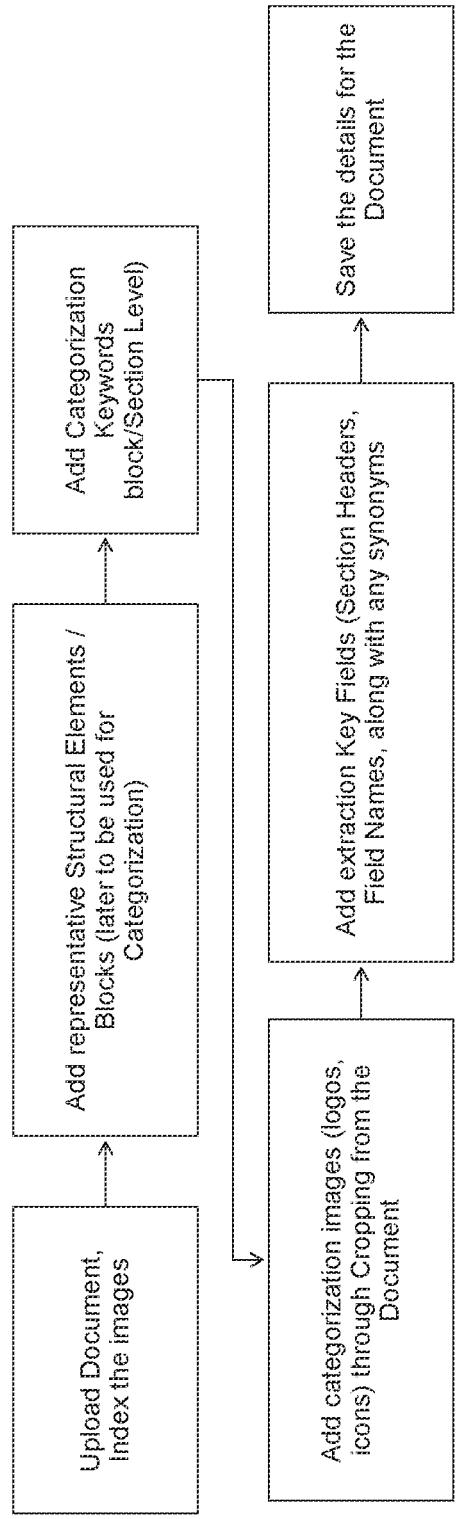
FIG. 3B depicts a flow-diagram for template less-based information extraction from the scanned document, in accordance with an embodiment of the present disclosure.

The hardware processors 104 further invokes the document categorizer wherein the document categorizer checks the input file to determine whether the input file can be processed template-based or template-less basis known set of templates or template-based forms in the database 108. There would be a set of features—key words, icons or logos on images and typical structural pattern of the page or blocks in the page are analyzed to categorize the document. In other words, pattern matching of key images (logo/icons) with those in database would be made and correlation co-efficient beyond a threshold value determines document category. Same approach would be made to assess similarity among the keywords in the input document with those stored in database. Full-Page OCR followed by natural language processing (NLP) is performed by the system 100 to find a good match of the File/image with those in the Database based on the key-word searches. Search is page-wise until it gets a match (beyond threshold value) and deter document category. This is followed by Structural Matching using Template Matching to ensure the categorization is made efficiently. Scaling is done while matching the pattern. In case, the match is below the threshold value, feedback may be obtained from one or more users for document categorization, and the associated images and key words are updated in the database 108. New Keywords, similar icon/logo are progressively added up in the database 108 for a specific category either based on user input or based on confidence level or correlation coefficients. While execution of documents, the categories are maintained with a flag—template-based or template-less. While categorization, the system would make out file category from the categorization flag. The data fields are managed as key and value. The keys are known in advance and are managed in a configuration file. For both categories, the number of keys shall not exceed those in the master category. The unavailable keys and values are excluded in the output. The template-based form is based on coordinates on the layouts, while template-less is purely based on the patterns or signatures of the forms. Basis the categorization, next steps are performed for further processing of the elements comprised in the input file. FIGS. 3A and 3B depict a flow-diagram for template and template-less based information extraction from the scanned document, in accordance with an embodiment of the present disclosure. More specifically, FIG. 3A depicts a flow-diagram for template-based information extraction from the scanned document, in accordance with an embodiment of the present disclosure. More specifically as depicted in FIG. 3A, the system 100 first indexes pages of the input file, wherein Region of Interest (ROI) for each page is selected, and the page name is set corresponding to the ROI. Further categorization keywords are added to each page depending upon the input file along with logo/icon for document categorization. Further, the system 100 (with or without user input(s)) adds key fields page-wise by adding section names and field names. Further, the system 100 annotates document by selecting the area for each specific field in the image wherein one or more coordinates are captured. The keys are hierarchical arranged to identify parent-child relationship or key and sub-key relationship and the above steps are repeated for each section of each page received as an input.

FIG. 3B depicts a flow-diagram for template less-based information extraction from the scanned document, in accordance with an embodiment of the present disclosure. More specifically as depicted in FIG. 3A, the system 100 first indexes pages of the input file and adds representative structural elements/blocks (later to be used for categorization). The relevant block(s) for extraction is/are cropped out to confirm the Region of Interest. This helps in carrying out template-based search later. Keywords are tagged or added for each block and/or section comprised in each page. Such keyword tagging or addition enables document categorization. Further, the system 100 adds categorization images (logos, icons) through cropping from the document. Key Images, words, phrases, and other metadata are added while a new image is fed as an input into the system 100. key images could be the logo, icon that is unique to distinguish or identify the document from the inventory when searched later. Similarly, other metadata for the document are keywords or phrases. These keywords help in search by using natural language processing (NLP) technique(s) (e.g., NLP technique as known in the art) to locate similar document while using template-less extraction. This is followed by Feature Matching using icons/logos to refine the search in identifying the matching document from the inventory. Furthermore, the system 100 add extraction key fields (section headers, field names, along with any synonyms) and the details for the document are saved.

Figure 4A:
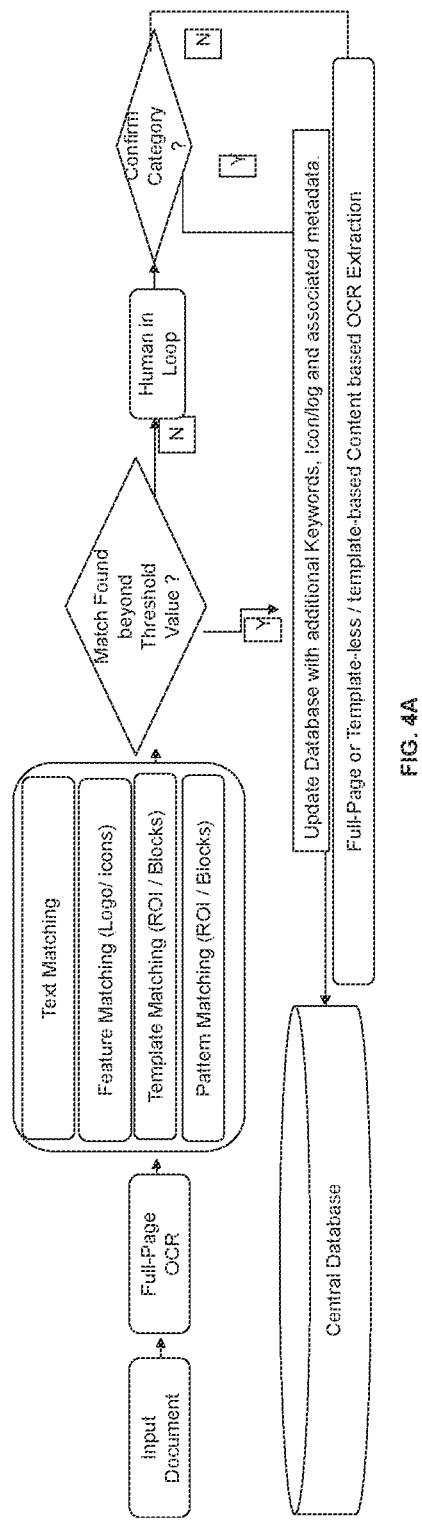
FIGS. 4A and 4B depict a flow diagram for document categorization, in accordance with an embodiment of the present disclosure.
Figure 4B:
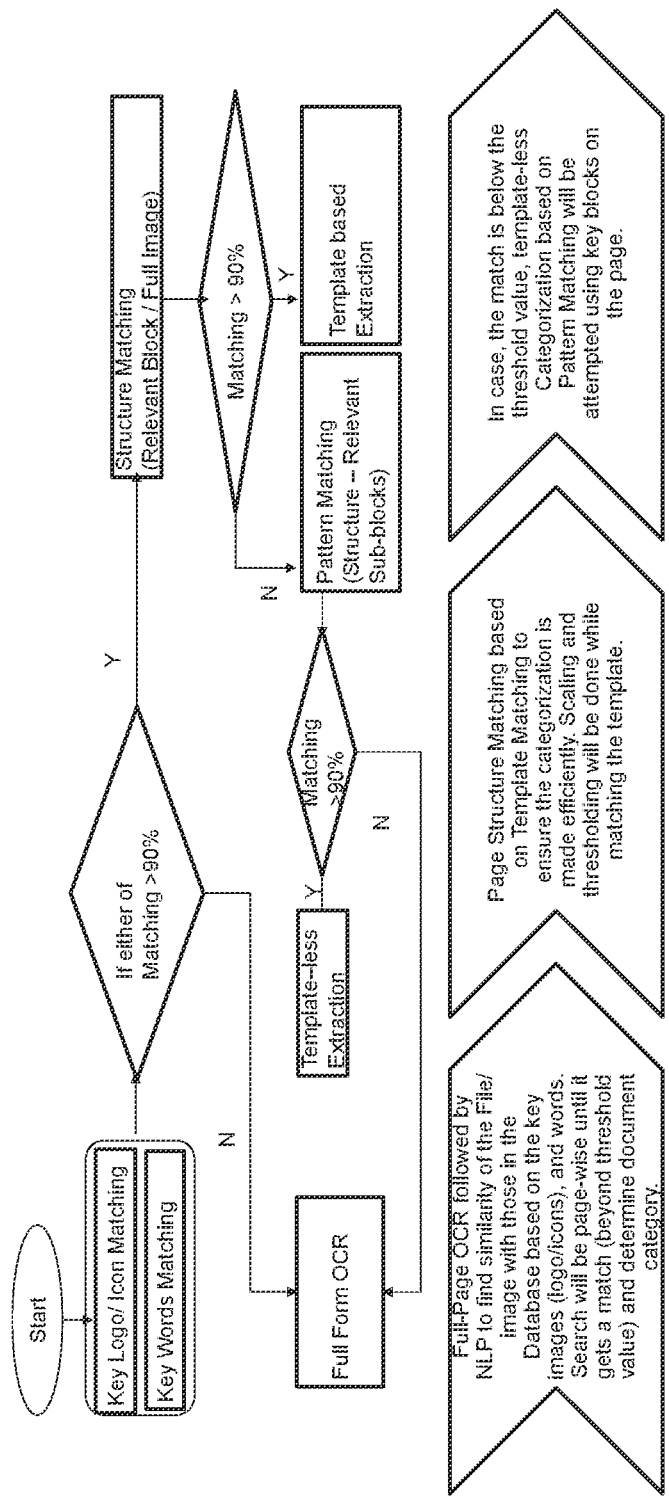

FIGS. 4A and 4B depict a flow diagram for document categorization, in accordance with an embodiment of the present disclosure. More specifically as depicted in FIG. 4A, the system 100 processes the document/input file for document categorization for identifying a document to be of known category (available in the database). If identified, execution of content-based OCR extraction is carried as per the known process, wherein the first step is to match the entire page based on template matching; if that does not give adequate accuracy, it would next try for matching a set of blocks for template-less categorization. Else it will process for full page OCR. Referring to FIG. 4B, the system 100 performs full-page OCR followed by NLP to find similarity of the file/image with those in the database 108 based on the key images (logo/icons), and words. Search is carried out by the system 100 page-wise until it gets a match (beyond threshold value) and determine document category. Additionally, the system 100 performs page structure matching based on template matching to ensure the categorization is made efficiently. Scaling and thresholding are done while matching the template. In case, the match is below the threshold value, template-less categorization based on Pattern Matching is performed using key blocks/section on the page/input file. For pattern matching, the Entire page or portion of the page having a table or prominent feature is used to search for an equivalent block in the master image. Based on the Correlation Coefficient beyond certain threshold value, the pattern matching is made, in one example embodiment. Such pattern matching technique shall not be construed as limiting the scope of the present disclosure.

The hardware processors 104 performs section wise content extraction wherein different sections of the input file are processed and intermediate results are stored in the memory 102. Identified features are extracted as sections of images/input file with a tagging of sections for lateral synthesis of outputs. Extraction of such sections is performed based on marked tags in section tagging file wherein the section tagging file(s) keep(s) a track of all the sections and sub-sections of the image (or input file). Section tagging can be tricky as most of the contents are arranged in queue, but individual nested objects like nested tables in cells need to be processed in stacked manner i.e., inner most nested content need to be processed first and recursively join the content to create contents of outer cells e.g., train with bogies of people and goods use queue for all bogies, whereas individual bogie of people has queue, whereas goods bogie places good(s) in queued or stacked manner as per requirement.

For instance, the system 100/hardware processors 104 checks for tables and identifies content in tables, if any and accordingly the tabular data along with its metadata labels and values are extracted. In other words, all tabular contents are primarily extracted. The system 100 may invoke other techniques based of type of nested contents in table's cells. Firstly, the type of table is identified for whether it's a vertical table or horizontal table or nested table, then separates headings and data cells. The cells of tables are intelligently processed to extract available information. FIG. 5 depicts a borderless table for information extraction, in accordance with an embodiment of the present disclosure. FIG. 6 depicts a nested table for information extraction, in accordance with an embodiment of the present disclosure. Contents type is analysed and identified and accordingly various techniques stored in the memory 102 are invoked. For instance, for digital text it calls OCR technique, for Radio-Button/Checkbox groups it calls OMR technique and for handwritten cursive writing it calls ICR technique, respectively. Sequence tagger keeps track of all such nested calls, so that outputs may be synthesized. More specifically, the system 100 searches for grid pattern inside tabular structure based on the dark pixel orientations to determine a present of a nested table. Alternate approach of deep learning-based detection of nested tables may also provisioned and implemented by the embodiments of the present disclosure.

Similarly, the system 100 performs Optical Character Recognition (OCR) technique and extracts text from different section or sub-sections of image/input file wherein text for header, footer, text in image body or text within table's cells are extracted. Further, the system 100 performs Optical Mark Recognition (OMR) technique to determine presence of radio buttons, checkbox groups and the like. Upon determining the presence of one or more radio buttons, check groups and the like, the system 100 via the OMR technique extracts information such as group name, list of values, checked radio button or selected checkboxes, and the like. In other words, the system 100 executes one or more pre-defined rules (e.g., known in the art rules comprised in the memory 102) and deep learning based advanced algorithms (comprised in the memory 102) that identify the radio-buttons (that are circular in shape or oval shape) or check boxes, their list values, group heading and whether radio-button/checkboxes are selected/checked or not. Identification of radio-button or checkboxes is very complex as algorithm needs to distinguish radio-button or checkbox with alphabets like A, B, D, P, O, P, Q, R, etc. Geometries with x number of pixels dimension (e.g., 40-pixel dimensions in an example considered by the present disclosure) have been considered to detect the OMR shapes. Solidity, Aspect Ratio, and patterns of the geometries are used to detect and discriminate radio button, checkbox, or oval shapes, in one example embodiment. The dimensions of the X and Y axes of the geometries distinguish radio buttons from oval shape. Oval shapes are assumed to be longer on X axis over Y-axis. Other complexity is in identifying selected/checked as difference users fill forms differently, use of tick mark (✓), cross (☒), Darkened (•) etc. which is performed by the system 100. Many users mark it partially, other fully, while a few users mark it beyond rectangle or circle and so on. OMR algorithm/technique executed by the hardware processors 104 handles all these complexities to extract right contents from image.

Further, the system 100 executes Intelligent Character Recognition technique wherein the system 100 checks for handwritten text and accordingly hand-written information is extracted. Cursive writing content extraction needs more complex processing as compared to optical character recognizer that can extract machine written characters only. The hardware processors 104 further synthesize intermediate results of different sections of image and generates final output of images (via the output generation module). Each input image can have separate output(s) or two or more images' contents may be combined for images that have continued content that spills from one page to next. Generated output may be produced as it is, or it may be processed further to identify text heading tags configured by power users (e.g., administrator or privileged user) for generating custom outputs. The system 100 may further comprise an application administration and integration module for administering current system's configuration, user management and other modules. This component also supports integration of current system's output with downstream applications that consume current system outputs.

Below description illustrates a template-less-based content/information extraction method from images. More specifically, the method includes receiving scanned images or documents of filled forms into system, wherein system stores them into database 108 and processes them further. First system extracts set of individual images 'I' from input documents, then analyzes quality as well as issues with image contents and identifies features of individual images. The system 100 then applies different quality and issue resolution techniques such as resolution improvement, skew/rotation/perspective correction and noise/blackened background/watermark removal to enhance image quality for further processing. Enhanced images are then divided into sections based on identified features. Features are identified based on suitable processing of contents e.g., tabular contents, digital text, hand-written cursive writing, and radio-buttons/checkboxes groups are being processed separately, so separated sections contain data related to these features. Extracted sections are processed by different sub-modules of content extraction module. As mentioned above, one technique/module may invoke another technique/module for specific part of the content identified in a section. For example, different cells of tabular content may contain digital text, handwritten text, or radio-button/checkboxes groups, so section content tagger keeps a track of such calls, so that later the content may be combined. Extracted content set 'E' is then processed further by section synthesizer (comprised in the memory 102) to combine the extracted outputs. Individual image may have individual page of extracted contents or spilled over content from one image to another image may be combined in one page. Once extracted contents are combined, then output set 'O' is generated in formats like JSON (JavaScript Object Notation) or XML (Extensible Markup Language) for further processing. FIGS. 7A through 7D, with reference to FIGS. 1 through 6, depict a sample output generated by the system 100 of FIG. 1 by processing an input document, in accordance with an embodiment of the present disclosure. More specifically, in FIGS. 7A through 7D, template-less-based information extraction method is described, wherein an input file is read by the system 100 and image enhancement is performed to eliminate and/or reduce background noise, blurriness, skewness, correct image/input file by appropriately rotating the input file, transform the perspective, determine watermark, size and aspect ratio and resolution and make appropriate corrections. Further, feature matching is carried out for logo/icon in the input file. Pattern matching of key images (e.g., logo, icons, and the like) is carried out with those in the database 108 and document is categorized accordingly based on a comparison of correlation coefficient and a pre-defined threshold. Further, a full-page OCR is performed following by a NLP to find a good/best-fit match of the input file with those comprised in the database 108 based on keyword and/or phrases search. The search is either performed page-wise or section-wise or features-wise until a match is obtained for document categorization. Structural matching using template matching is carried out to ensure and confirm that the document categorization is correct and appropriate. During the pattern matching scaling is also done to determine page size and resolution accuracy and its fitment. Furthermore, other enhancements are carried out such as correction or any broken line(s) being identified, correction of corner(s), removal of header-footer text, if any, removal of fax/straight line in case detected. Tables and element types comprised in the tables are identified. The table(s) and OMR are processed as in the hierarchical structure as per the key-value pairs (vis-à-vis master template comprised in the database 108). An output is generated post processing of text, features, objects, and the like wherein the output may be in one or more formats (e.g., a JSON file) and the file is shared as a service to downstream solution.

Figure 8A:
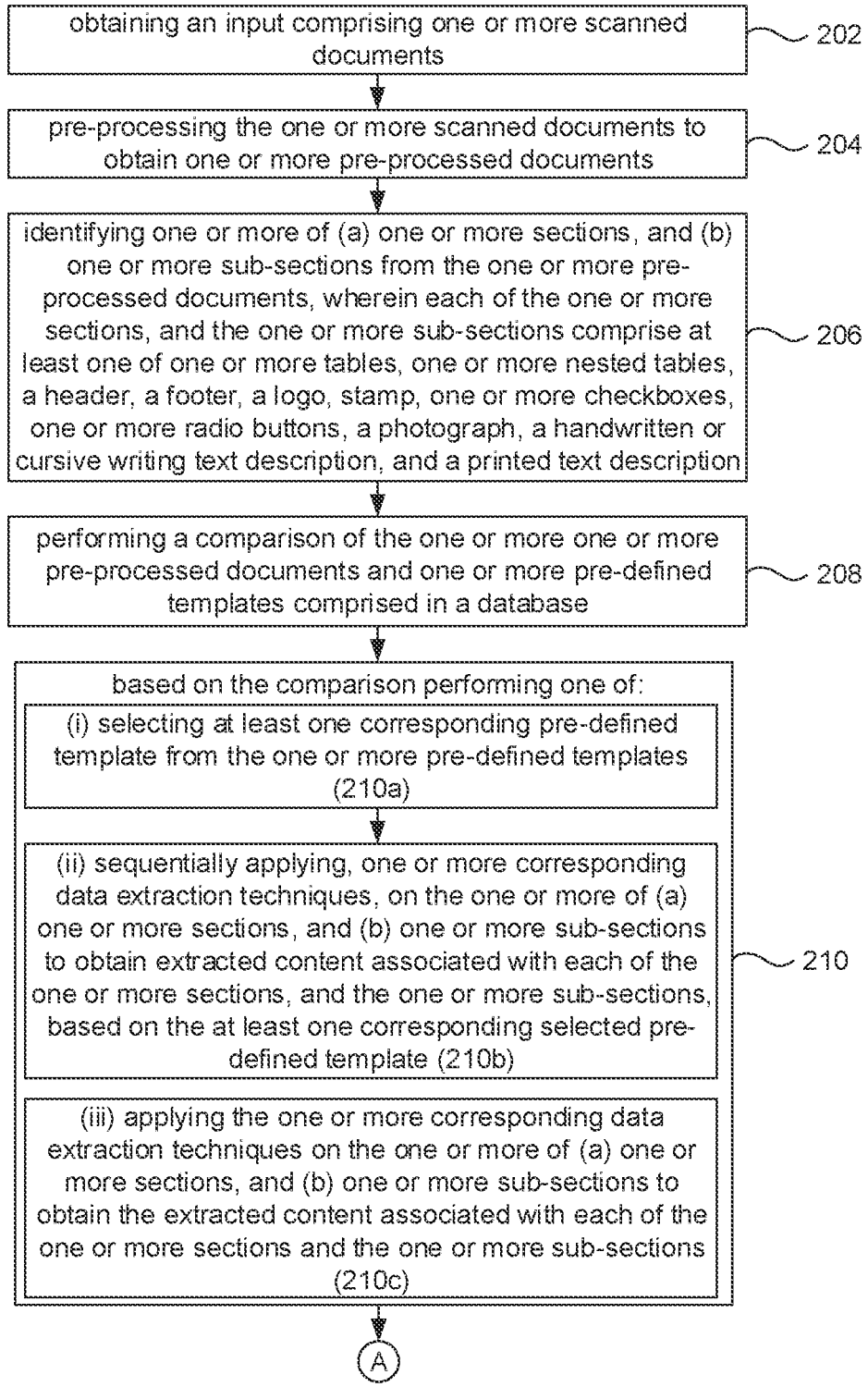
FIGS. 8A and 8B depict an exemplary flow chart illustrating a method for automated information extraction from scanned documents, in accordance with an embodiment of the present disclosure.
Figure 8B:
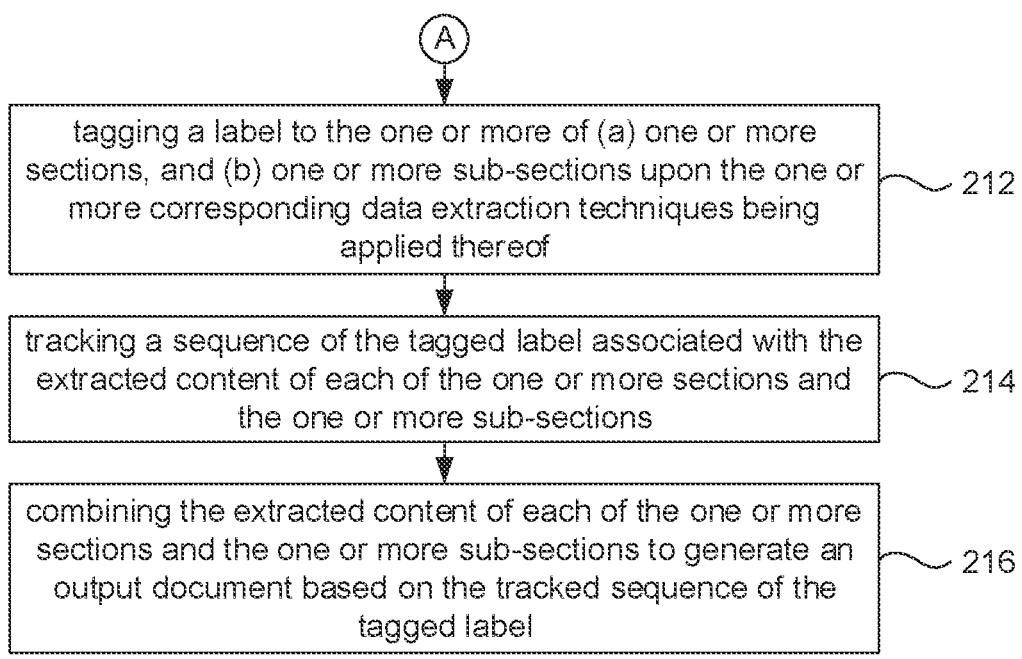

FIGS. 8A through 8B, with reference to FIGS. 1 through 7D, depict an exemplary flow chart illustrating a method for automated information extraction from scanned documents, in accordance with an embodiment of the present disclosure. In an embodiment, FIGS. 8A and 8B may be collectively referred as FIG. 8 and interchangeably used herein. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the other FIGS. 2A through 7D. In an embodiment, at step 202 of the present disclosure, the one or more hardware processors 104 obtaining an input comprising one or more scanned documents. As mentioned above, the scanned documents may be an invoice, an application form, an answer sheet, and a printed document containing handwritten text, a document containing text and tables/nest tables, and the like. Further, at step 204 of the present disclosure, the one or more hardware processors 104 pre-process the one or more scanned documents to obtain (i) one or more pre-processed documents. The one or more scanned documents are pre-processed for improving the quality of the one or more scanned documents. Such pre-processing technique includes resolution enhancement, appropriate rotation of the documents, skew correction, brightness and contrast correction and the like. It is to be understood by a person having ordinary skill in the art or person skilled in the art that above pre-processing parameters such as resolution enhancement, rotation, skew correction, and the like shall not be construed as limiting the scope of the present disclosure.

Upon pre-processing, at step 206 of the present disclosure, the one or more hardware processors 104 identify one or more of (a) one or more sections, and (b) one or more sub-sections from the one or more pre-processed documents wherein each of the one or more sections, and the one or more sub-sections comprise at least one of one or more tables, one or more nested tables, a header, a footer, a logo, stamp, one or more checkboxes, one or more radio buttons, a photograph, a handwritten or cursive writing text description, and a printed text description.

At step 208 of the present disclosure, the one or more hardware processors 104 perform a comparison of the one or more pre-processed documents and one or more pre-defined templates comprised in a database. In the present disclosure, the hardware processors 104 invoke the document categorizer wherein the document categorizer checks the one or more pre-processed documents to determine whether the one or more pre-processed documents can be processed template-based or template-less basis known set of templates or template-based forms in the database 108. For instance, if there is a pre-defined template comprised in the database 108 for a specification document or a section, then that identified template may be used to perform subsequent steps of data extraction, label tag, and combining extracted data to generated desired output. In case no matching template is found, the system 100 executes one or more data extraction techniques and performs other subsequent steps as discussed below. Based on the comparison, as step 210 of the present disclosure, the one or more hardware processors 104 perform one or more steps. The one or more steps comprise one of: (i) selecting at least one corresponding pre-defined template from the one or more pre-defined templates (210a); and (ii) sequentially applying, one or more corresponding data extraction techniques, on the one or more of (a) one or more sections, and (b) one or more sub-sections to obtain extracted content associated with each of the one or more sections, and the one or more sub-sections, based on the at least one corresponding selected pre-defined template (210b); or (iii) applying the one or more corresponding data extraction techniques on the one or more of (a) one or more sections, and (b) one or more sub-sections to obtain the extracted content associated with each of the one or more sections and the one or more sub-sections (210c). In an embodiment of the present disclosure, the one or more corresponding data extraction techniques comprise an optical character recognition (OCR) technique, an intelligent character recognition (ICR) technique, an optical mark recognition (OMR) technique, a table extraction technique, and the like.

For instance, consider the one or more tables and the one or more nested tables are detected at one or more sections/sub-sections and the one or more corresponding data extraction techniques (e.g., table extraction technique) is/are invoked by the system 100 accordingly. Assuming at least some of the tables/nested tables amongst the tables and the nested tables identified are one of a tempered table or a borderless table, then the step of applying, one or more corresponding data extraction techniques comprises: estimating a bounding box for the tempered table or the borderless table; fitting one or more border lines to the tempered table or the borderless table based on the estimated bounding box; applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizontal and vertical lines for each cell such that one or more cells comprised in the tempered table or the borderless table converge straight horizontally and vertically to a table with non-overlapping content comprised therein; and extracting the non-overlapping content from the tempered table or the borderless table specific to a section. For instance, the one or more pre-defined rules may include but are not limited to, for borderless or partial/indistinct bordered tables, an initial pre-processing is applied to remove all borders (partial/indistinct) from the image/table image. Bounding region is estimated for all text (in the cells) and finally a table is created for the maximum bounding region for each cell over rows and columns to ensure no text (data) loss. The process captures the minimum and maximum coordinates (X, Y) for each text field and draws horizonal and vertical lines for each cell to ensure that they all converge straight horizontally and vertically to build a table with no overlap or cutting text. To attain convergence, a rule may include say capture the minimum and maximum coordinates (X, Y) for each text field and draw horizonal and vertical lines for each cell to ensure that they all converge straight horizontally and vertically to build a table with no overlap or cutting text. In an embodiment, one or more deep learning-based models built from large datasets is implemented by the system and method of the present disclosure for detecting and localizing table in image. The one or more deep learning-based models are comprised in the database 108 and invoked by the one or more hardware processors 104 for execution as applicable. Once the table is localized it is cropped out from the main image based on the bounding coordinates and passed for table extraction. The above step of cropping may also be construed as a rule wherein when a table is localized, the rule is executed to crop out from the main image based on the bounding coordinates and passed for table extraction.

Referring to FIG. 8, at step 212 of the present disclosure, the one or more hardware processors 104 tag a label to the one or more of (a) one or more sections, and (b) one or more sub-sections upon the one or more corresponding data extraction techniques being applied thereof. In an embodiment, when a corresponding data extraction technique is applied a specific section or sub-section, either during the processing or after the processing of the specific section or sub-section, the section/sub-section (along with the corresponding output) is tagged with a label. This process continues until the last section/sub-section in the document that is being processed. Once all the sections/sub-sections are processed, at step 214 of the present disclosure, the one or more hardware processors 104 track a sequence of the tagged label associated with the extracted content of each of the one or more sections and the one or more sub-sections. Such label tagging can include say, but not limited to, L1 (referring to logo section) followed by T1 (referring to table 1), followed by T2 (referring to nested table 2 within table 1), followed by C1 (referring to checkbox section 1), followed by C2 (referring to checkbox section 2), followed by R1 (referring to radio buttons section 1), and the like. In an embodiment, depending upon the order of processing of these sections/sub-sections, and/or the timestamp at which these sections/sub-sections are processed, the sequence of label tagging as shown above (e.g., timestamp may be used for tracking the sequence and processing of these sections) is generated/recorded. Further, at step 214 of the present disclosure, the one or more hardware processors 104 combine extracted content of each of the one or more sections and the one or more sub-sections to generate an output document based on the tracked sequence of the tagged label.

In an embodiment, extraction of content extraction of the one or more radio buttons wherein the radio buttons comprise one of an oval shape radio button, or a circular shape radio button. The above examples of radio buttons shall not be construed as limiting the scope of the present disclosure. The radio buttons and the checkboxes are identified based on an aspect ratio, Hull area, Solidity, an equivalent diameter, perimeter, a number of sides associated with the one or more radio buttons and the one or more checkboxes, and a number of pixels in the geometries associated thereof. The above exemplary parameters (e.g., aspect ratio, hull area, and the like) for identifying radio buttons shall not be construed as limiting the scope of the present disclosure. The above description can be better understood by way of following examples. For the localization of OMR objects (e.g., such as checkbox, radio button, and the like), the scanned documents are processed to find small contours having square, rectangular, circular shapes. The contours after basic image pre-processing are analysed for Aspect ratio, Hull area, Solidity, Equivalent Diameter, Perimeter, and number of sides. Based on certain rules as listed below on these parameters' checkboxes, and radio buttons (Oval or Circular) are distinguished. Solidity that is calculated as ratio of the area of the contour with that of the convex hull region helps in understanding OMR. As mentioned above, the number of pixels also help in determining whether the OMR object is a checkbox or a radio button. For instance, the system and method determine a number of black pixels for a cropped area around the one or more checkboxes and perform a comparison of the number of black pixels for the cropped area around the one or more checkboxes with a pre-defined threshold. Based on the comparison, the system and method identifying an OMR object either as a filled checkbox or an unfilled checkbox. A threshold value of 80% was considered to recognize them as OMR. Such threshold value of 80% shall not be construed as limiting the scope of the present disclosure. So based on the comparison, the one or more checkboxes are identified as a filled checkbox or an unfilled checkbox. If the number of pixels for the cropped area around the one or more checkboxes is greater than or equal to 80% of the checkbox, then it is identified as filled checkbox. Alternatively, the checkboxes are identified based on the number of sides (e.g., 4 sides) and aspect Ratio of 1. Further, contour perimeter and approximation are calculated to validate the OMRs and their types—whether Checkbox or Radio Button. To confirm, whether an OMR object is a radio button or not, an equivalent diameter and its area is used. For instance, equivalent diameter is the diameter of a circle whose area is same as the contour area which ensures that a specific OMR object is a radio button. Furthermore, orientation is detected by the system and method of the present disclosure when OMR technique is applied. Orientation refers to an angle at which OMR object is directed. This helps in recognizing the radio button whether it is oval or Circular by calculating the Aspect Ratio from the extracted major and minor axis.

Upon determining that these are checkbox or radio buttons, the hardware processors 104 check whether they are filled or unfilled for radio Buttons and ticked/crossed for checkboxes by counting black pixels for the cropped area of OMR object and estimating if they are above a threshold of 60% of the hull area (e.g., convex hull region). Examples of the above threshold values (e.g., 60%) shall not be construed as limiting the scope of the present disclosure.

Once all OMR objects in a cell are identified, they are sorted in row-wise order. Two OMR objects are taken at a time and the relative positioning between them is checked. This is done to mark off the area where the label for the OMR ends. The list of OMR objects is then iterated over and the label for that OMR is obtained and written to a list if it is checked, and this data is later converted into XML. In other words, the above sorting technique may be carried out once the checkbox and radio buttons are tagged with a label. For instance, the step of tagging a label to the one or more of (a) one or more sections, and (b) one or more sub-sections comprises: tagging a label to a section or a sub-section comprising the one or more checkboxes, wherein the one or more checkboxes are sorted in an order to obtain a set of sorted checkboxes. The one or more checkboxes are sorted by sequentially determining a relative position between two checkboxes until a last checkbox and a penultimate checkbox are detected to determine an end of the section or the section comprising the one or more checkboxes.

Embodiments of the present disclosure provides system and method for automated information extraction from scanned documents. The present disclosure provides various modules that are executed by the hardware processors 104. For instance, modules are implemented by the system 100 for features identification and extraction such as Table, Digital Text, Handwritten Cursive Writing, Radio-Buttons/Checkboxes Groups, Footer/Header etc. Further, the system 100 assesses quality of the input file and accordingly processes to obtain enhanced output document by performing various quality processing techniques (e.g., resolution enhancement, skew correction, rotation, depth perspective and the like).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining, via one or more hardware processors, an input comprising one or more scanned documents;
   pre-processing the one or more scanned documents to obtain one or more pre-processed documents;
   identifying (a) one or more sections, and (b) one or more sub-sections from the one or more pre-processed documents, wherein the one or more sections comprise at least one of one or more tables, one or more nested tables, a header, a footer, a logo, and a stamp, and wherein the one or more sub-sections comprise at least one of one or more checkboxes, one or more radio buttons, a photograph, a handwritten or cursive writing text description, and a printed text description;
   performing a comparison of the one or more one or more pre-processed documents and one or more pre-defined templates comprised in a database;
   based on the comparison performing one of:
   (i) selecting at least one pre-defined template from the one or more pre-defined templates; and
   (ii) sequentially applying, one or more data extraction techniques, on the (a) one or more sections, and (b) one or more sub-sections to obtain extracted content associated with each of the one or more sections, and the one or more sub-sections, based on the at least one selected pre-defined template; or
   (iii) applying the one or more data extraction techniques on the (a) one or more sections, and (b) one or more sub-sections to obtain the extracted content associated with each of the one or more sections and the one or more sub-sections, wherein when at least one of the one or more tables and the one or more nested tables are identified as one of a tempered table or a borderless table, the step of applying, one or more data extraction techniques comprises:
   estimating a bounding box for the tempered table or the borderless table;
   fitting one or more border lines to the tempered table or the borderless table based on the estimated bounding box;
   applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizontal and vertical lines for each cell such that one or more cells comprised in the tempered table or the borderless table converge straight horizontally and vertically to a table with non-overlapping content comprised therein, wherein to attain convergence, the one or more pre-defined rules comprise capturing minimum and maximum coordinates for each text field and drawing horizontal and vertical lines for each cell to ensure that each cell converge straight horizontally and vertically to build the tempered table or the borderless table with no overlapping text; and
   extracting the non-overlapping content from the tempered table or the borderless table specific to a section;
   tagging a label to the (a) one or more sections, and (b) one or more sub-sections upon the one or more data extraction techniques being applied thereof;
   tracking a sequence of the label associated with the extracted content of each of the one or more sections and the one or more sub-sections; and
   combining the extracted content of each of the one or more sections and the one or more sub-sections to generate an output document based on the tracked sequence of the label associated with the extracted content of each of the one or more sections and the one or more sub-sections, wherein the output document is generated in a form of one of extensible markup language (XML) format and JavaScript Object Notation (JSON) that is to be used for analytics and reporting systems.

2. The processor implemented method of claim 1, wherein the one or more radio buttons comprise one of an oval shape radio button, or a circular shape radio button.

3. The processor implemented method of claim 1, wherein the one or more data extraction techniques comprise an optical character recognition (OCR) technique, an intelligent character recognition (ICR) technique, an optical mark recognition (OMR) technique, and a table extraction technique.

4. The processor implemented method of claim 1, further comprising:
   determining number of black pixels for a cropped area around the one or more checkboxes;
   performing a comparison of the number of black pixels for the cropped area around the one or more checkboxes with a pre-defined threshold; and
   identifying the one or more checkboxes as a filled checkbox or an unfilled checkbox based on the comparison.

5. The processor implemented method of claim 1,
   wherein the step of tagging a label to the (a) one or more sections, and (b) one or more sub-sections comprises:
   tagging a label to a section or a sub-section comprising the one or more checkboxes; and
   sorting the checkboxes in an order to obtain a set of sorted checkboxes, wherein the checkboxes are sorted by sequentially determining a relative position between two checkboxes until a last checkbox and a penultimate checkbox are detected to determine an end of the section or the sub-section comprising the checkboxes.

6. A system, comprising:
   a memory storing instructions;
   one or more communication interfaces; and
   one or more hardware processors coupled to the memory via the one or more communication interfaces, wherein the one or more hardware processors are configured by the instructions to:
   obtain an input comprising one or more scanned documents;
   pre-process the one or more scanned documents to obtain (i) one or more pre-processed documents;
   identify (a) one or more sections, and (b) one or more sub-sections from the one or more pre-processed documents, wherein the one or more sections comprise at least one of one or more tables, one or more nested tables, a header, a footer, a logo, and a stamp, and wherein the one or more sub-sections comprise at least one of one or more checkboxes, one or more radio buttons, a photograph, a handwritten or cursive writing text description, and a printed text description;
   performing a comparison of the one or more one or more pre-processed documents and one or more pre-defined templates comprised in a database;
   based on the comparison perform one of:
   (i) selecting at least one pre-defined template from the one or more pre-defined templates; and
   (ii) sequentially applying, one or more data extraction techniques, on the (a) one or more sections, and (b) one or more sub-sections to obtain extracted content associated with each of the one or more sections, and the one or more sub-sections, based on the at least one selected pre-defined template; or
   (iii) applying the one or more data extraction techniques on the (a) one or more sections, and (b) one or more sub-sections to obtain the extracted content associated with each of the one or more sections and the one or more sub-sections, wherein when at least one of the one or more tables and the one or more nested tables are identified as one of a tempered table or a borderless table, the step of applying, one or more data extraction techniques comprises:
   estimating a bounding box for the tempered table or the borderless table;
   fitting one or more border lines to the tempered table or the borderless table based on the estimated bounding box;
   applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizontal and vertical lines for each cell such that one or more cells comprised in the tempered table or the borderless table converge straight horizontally and vertically to a table with non-overlapping content comprised therein, wherein to attain convergence, the one or more pre-defined rules comprise capturing minimum and maximum coordinates for each text field and drawing horizontal and vertical lines for each cell to ensure that each cell converge straight horizontally and vertically to build the tempered table or the borderless table with no overlapping text; and
   extracting the non-overlapping content from the tempered table or the borderless table specific to a section;
   tag a label to the (a) one or more sections, and (b) one or more sub-sections upon the one or more data extraction techniques being applied thereof;
   track a sequence of the label associated with the extracted content of each of the one or more sections and the one or more sub-sections; and
   combine the extracted content of each of the one or more sections and the one or more sub-sections to generate an output document based on the tracked sequence of the label associated with the extracted content of each of the one or more sections and the one or more sub-sections, wherein the output document is generated in a form of one of extensible markup language (XML) format and JavaScript Object Notation (JSON) that is to be used for analytics and reporting systems.

7. The system of claim 6, wherein the one or more radio buttons comprise one of an oval shape radio button, or a circular shape radio button.

8. The system of claim 6, wherein the one or more data extraction techniques comprise an optical character recognition (OCR) technique, an intelligent character recognition (ICR) technique, an optical mark recognition (OMR) technique, and a table extraction technique.

9. The system of claim 6, wherein the one or more hardware processors are further configured by the instructions to:
   determine number of black pixels for a cropped area around the one or more checkboxes;
   perform a comparison of the number of black pixels for the cropped area around the one or more checkboxes with a pre-defined threshold; and
   identify the one or more checkboxes as a filled checkbox or an unfilled checkbox based on the comparison.

10. The system of claim 6, wherein the step of tagging a label to the (a) one or more sections, and (b) one or more sub-sections comprises:
    tagging a label to a section or a sub-section comprising the one or more checkboxes; and
    sorting the checkboxes in an order to obtain a set of sorted checkboxes, wherein the checkboxes are sorted by sequentially determining a relative position between two checkboxes until a last checkbox and a penultimate checkbox are detected to determine an end of the section or the sub-section comprising the checkboxes.

11. One or more non-transitory machine-readable information storage mediums comprising one or more instructions which when executed by one or more hardware processors cause a method for automated information extraction from scanned documents by:

obtaining, via the one or more hardware processors, an input comprising one or more scanned documents;

pre-processing the one or more scanned documents to obtain (i) one or more pre-processed documents;

identifying (a) one or more sections, and (b) one or more sub-sections from the one or more pre-processed documents, wherein the one or more sections comprise at least one of one or more tables, one or more nested tables, a header, a footer, a logo, and a stamp, and wherein the one or more sub-sections comprise at least one of one or more checkboxes, one or more radio buttons, a photograph, a handwritten or cursive writing text description, and a printed text description;

performing a comparison of the one or more one or more pre-processed documents and one or more pre-defined templates comprised in a database;

based on the comparison performing one of:

(i) selecting at least one pre-defined template from the one or more pre-defined templates; and (ii) sequentially applying, one or more data extraction techniques, on the (a) one or more sections, and (b) one or more sub-sections to obtain extracted content associated with each of the one or more sections, and the one or more sub-sections, based on the at least one selected pre-defined template; or (iii) applying the one or more data extraction techniques on the (a) one or more sections, and (b) one or more sub-sections to obtain the extracted content associated with each of the one or more sections and the one or more sub-sections, wherein when at least one of the one or more tables and the one or more nested tables are identified as one of a tempered table or a borderless table, the step of applying, one or more data extraction techniques comprises:

estimating a bounding box for the tempered table or the borderless table;

fitting one or more border lines to the tempered table or the borderless table based on the estimated bounding box;

applying one or more pre-defined rules on the tempered table or the borderless table by traversing through each cell of the tempered table or the borderless table to identify content comprised therein, wherein the step of applying one or more pre-defined rules on the tempered table or the borderless table comprises fitting one or more horizontal and vertical lines for each cell such that one or more cells comprised in the tempered table or the borderless table converge straight horizontally and vertically to a table with non-overlapping content comprised therein, wherein to attain convergence, the one or more pre-defined rules comprise capturing minimum and maximum coordinates for each text field and drawing horizontal and vertical lines for each cell to ensure that each cell converge straight horizontally and vertically to build the tempered table or the borderless table with no overlapping text; and extracting the non-overlapping content from the tempered table or the borderless table specific to a section;

tagging a label to the (a) one or more sections, and (b) one or more sub-sections upon the one or more data extraction techniques being applied thereof;

tracking a sequence of the label associated with the extracted content of each of the one or more sections and the one or more sub-sections; and combining the extracted content of each of the one or more sections and the one or more sub-sections to generate an output document based on the tracked sequence of the label associated with the extracted content of each of the one or more sections and the one or more sub-sections, wherein the output document is generated in a form of one of extensible markup language (XML) format and JavaScript Object Notation (JSON) that is to be used for analytics and reporting systems.

12. The one or more non-transitory machine-readable information storage mediums of claim 11, wherein the one or more data extraction techniques comprise an optical character recognition (OCR) technique, an intelligent character recognition (ICR) technique, an optical mark recognition (OMR) technique, and a table extraction technique.

13. The one or more non-transitory machine-readable information storage mediums of claim 11, wherein the method further comprises:

determining number of black pixels for a cropped area around the one or more checkboxes;

performing a comparison of the number of black pixels for the cropped area around the one or more checkboxes with a pre-defined threshold; and identifying the one or more checkboxes as a filled checkbox or an unfilled checkbox based on the comparison.

14. The one or more non-transitory machine-readable information storage mediums of claim 11, wherein the step of tagging a label to the (a) one or more sections, and (b) one or more sub-sections comprises:

tagging a label to a section or a sub-section comprising the one or more checkboxes; and sorting the checkboxes in an order to obtain a set of sorted checkboxes, wherein the checkboxes are sorted by sequentially determining a relative position between two checkboxes until a last checkbox and a penultimate checkbox are detected to determine an end of the section or the sub-section comprising the checkboxes.

\* \* \* \* \*